US012314214B2

(12) United States Patent
Gupta et al.

(10) Patent No.: US 12,314,214 B2
(45) Date of Patent: May 27, 2025

(54) ENSURING DATA INTEGRITY IN POWER DOMAIN CROSSING FIFO QUEUES

(71) Applicant: QUALCOMM Incorporated, San Diego, CA (US)

(72) Inventors: Rohit Gupta, Bengaluru (IN); Shubham Maheshwari, Jaipur (IN); Mayukh Mallik, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 18/181,422

(22) Filed: Mar. 9, 2023

(65) Prior Publication Data

US 2024/0303216 A1 Sep. 12, 2024

(51) Int. Cl.
*G06F 3/06* (2006.01)
*G06F 5/06* (2006.01)
*G06F 15/78* (2006.01)

(52) U.S. Cl.
CPC ............ *G06F 15/7807* (2013.01); *G06F 5/06* (2013.01)

(58) Field of Classification Search
CPC .............................. G06F 5/06; G06F 15/7807
See application file for complete search history.

(56) References Cited

U.S. PATENT DOCUMENTS

| 11,971,831 | B1* | 4/2024 | Katenbrink | G06F 5/06 |
| 2013/0007314 | A1* | 1/2013 | Tung | G06F 1/12 |
| | | | | 710/51 |
| 2018/0174623 | A1* | 6/2018 | Xu | G11C 7/1012 |
| 2023/0375606 | A1* | 11/2023 | Nam | G11C 29/42 |

OTHER PUBLICATIONS

International Search Report and Written Opinion—PCT/US2024/016364—ISA/EPO—Jun. 7, 2024.

* cited by examiner

*Primary Examiner* — Kurtis R Bahr
(74) *Attorney, Agent, or Firm* — Patterson + Sheridan, L.L.P.

(57) ABSTRACT

Aspects of the present disclosure provide techniques and apparatus for transferring data, such as between power domains via a first in, first out (FIFO) queue. An example method of transferring data includes selecting, via a source multiplexer, a first memory location included in a FIFO queue and storing first data, where the source multiplexer and the FIFO queue are in a first power domain; outputting the first data to a first level shifter; calculating, in the first power domain, a first value based on the first data; outputting the first value to a second level shifter; selecting, via at least one destination multiplexer included in a second power domain, the first level shifter and the second level shifter; calculating, in the second power domain, a second value based on the first data; and comparing the first value to the second value to generate a result.

28 Claims, 5 Drawing Sheets

| SELECTING MEMORY LOCATION 312-0 | | SELECTING MEMORY LOCATION 312-4 | | SELECTING MEMORY LOCATION 312-1 | |
|---|---|---|---|---|---|
| rptr | rsel[3:0] | rptr | rsel[3:0] | rptr | rsel[3:0] |
| 0 | 0000 | 0 | 0000 | 0 | 0000 |
| 1 | 0001 | 1 | 0001 | 1 | 0001 |
| 2 | 0011 | 2 | 0011 | 2 | 0011 |
| 3 | 0111 | 3 | 0111 | 3 | 0111 |
| 4 | 1111 | 4 | 1111 | 4 | 1111 |
| 5 | 1110 | 5 | 1110 | 5 | 1110 |
| 6 | 1100 | 6 | 1100 | 6 | 1100 |
| 7 | 1000 | 7 | 1000 | 7 | 1000 |

FIG. 4

ENSURING DATA INTEGRITY IN POWER DOMAIN CROSSING FIFO QUEUES

BACKGROUND

Field of the Disclosure

Certain aspects of the present disclosure generally relate to electronic components, and more particularly to a computing system having multiple power domains.

Description of Related Art

Modern computing systems commonly implement power-saving techniques in order to enable high-performance operation in mobile environments. For example, some power-saving techniques enable a computing system to implement multiple power domains, enabling portions of the computing system to be powered down when idle. Such power-saving techniques may negatively affect data integrity, making such devices unsuitable for applications in which functional safety is a priority. Consequently, as power-efficient computing systems are increasingly implemented in high-performance applications where user safety is important (e.g., advanced driver assistance systems (ADAS)), various challenges are encountered.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide the advantages described herein.

Certain aspects of the present disclosure provide a method of transferring data across power domains. The method generally includes selecting, via a source multiplexer, a first memory location where first data is stored in a first in, first out (FIFO) queue and storing first data. The source multiplexer and the FIFO queue are in a first power domain. The method further includes transferring the first data through a first level shifter; calculating, in the first power domain, a first value based on the first data; transferring the first value through a second level shifter; selecting, via at least one destination multiplexer included in a second power domain, the first level shifter and the second level shifter; calculating, in the second power domain, a second value based on the first data; and comparing the first value to the second value to generate a result. The result indicates that the first data was corrupted during transmission from the first power domain to the second power domain.

Certain aspects of the present disclosure provide an apparatus for transferring data across power domains. The apparatus generally includes a source multiplexer coupled to a first memory location included in a first in, first out (FIFO) queue and storing first data. The source multiplexer and the FIFO queue are in a first power domain. The apparatus further includes a first level shifter coupled to the source multiplexer and configured to selectively receive the first data from the source multiplexer; a source error circuit coupled to the source multiplexer and included in the first power domain, the source error circuit configured to: calculate a first value based on the first data, and transfer the first value through a second level shifter coupled to the source error circuit; at least one destination multiplexer included in a second power domain and configured to select the first data and the first value from first level shifter and the second level shifter; and a destination error circuit coupled to the at least one destination multiplexer and included in the second power domain, the at least one destination multiplexer configured to calculate a second value based on the first data. The first value is compared to the second value to generate a result indicating that the first data was corrupted during transmission from the first power domain to the second power domain.

Certain aspects of the present disclosure provide a vehicle control system. The vehicle control system generally includes a system-on-a-chip (SoC) having a first power domain and a second power domain, the SoC comprising: a source multiplexer coupled to a first memory location included in a first in, first out (FIFO) queue and FIFO storing first data. The source multiplexer and the FIFO queue are in the first power domain. The vehicle control system further includes a first level shifter coupled to the source multiplexer and configured to transfer the first data received from the source multiplexer; a source error circuit coupled to the source multiplexer and included in the first power domain, the source error circuit configured to: calculate a first value based on the first data, and transfer the first value through a second level shifter coupled to the source error circuit; at least one destination multiplexer included in the second power domain and configured to select the first level shifter and the second level shifter; and a destination error circuit coupled to the at least one destination multiplexer and included in the second power domain, the at least one destination multiplexer configured to calculate a second value based on the first data. The first value is compared to the second value to generate a result indicating that the first data was corrupted during transmission from the first power domain to the second power domain.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

FIG. 4 is an example of read select (rsel) data values that may be sequentially received via a read select level shifter to access memory locations in the FIFO queue.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
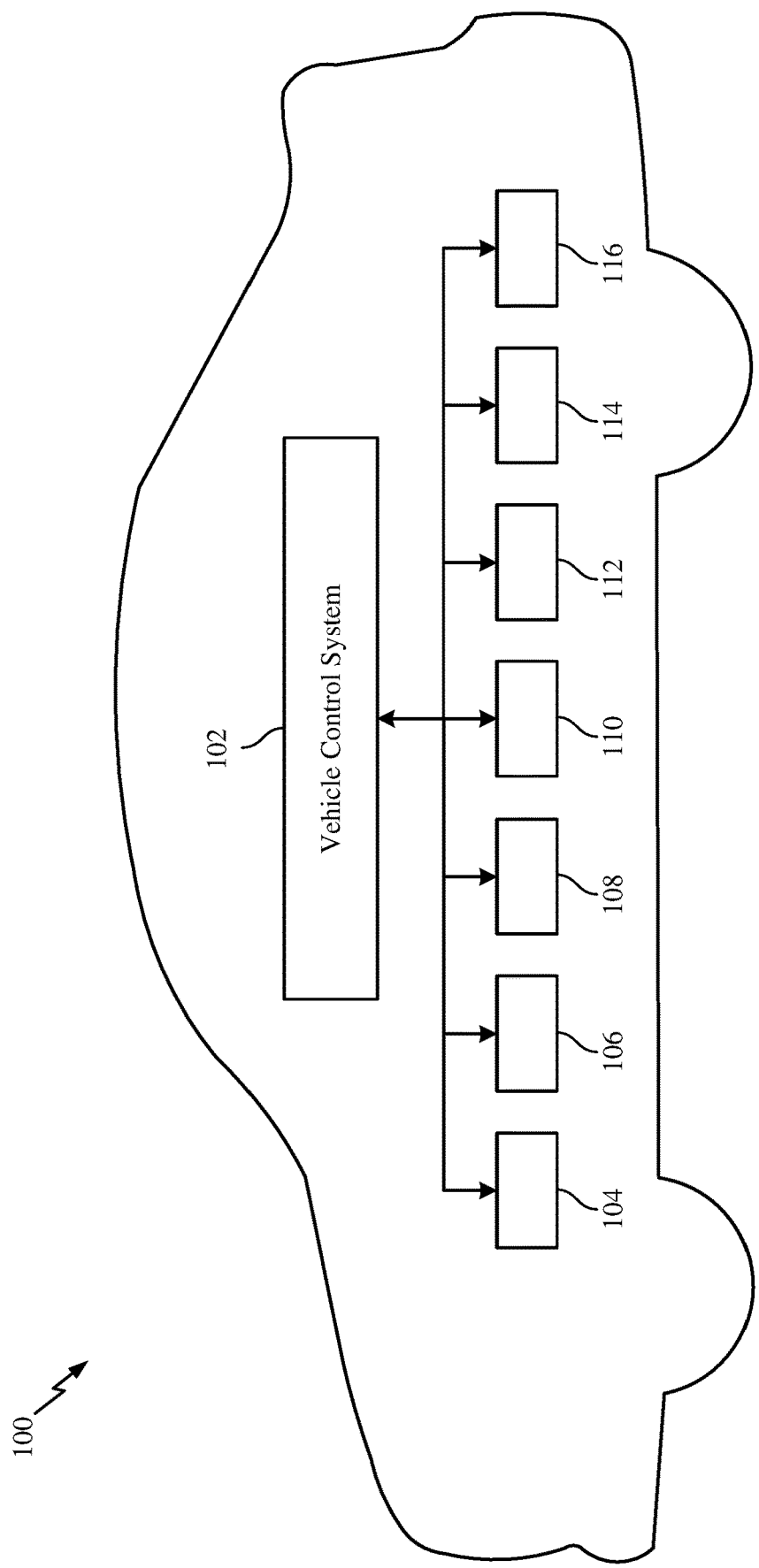
FIG. 1 is a diagram of an example vehicle with a vehicle control system.

Certain aspects of the present disclosure relate to methods and apparatus for transferring data across power domains included in a computing system, such as a system-on-a-chip (SoC).

Modern computing systems commonly implement multiple power domains in order to reduce overall power consumption while ensuring that critical components continue to receive sufficient power to operate at high clock frequencies and with low latency. For example, a SoC implementing multiple power domains may be capable of switching off one or more low-priority power domains when all components within a particular power domain are idle, while continuing to provide power to high-priority components in one or more other power domains. As power-efficient computing systems are increasingly implemented in high-performance applications where user safety is important, various challenges are encountered.

One such challenge is encountered when transferring data between power domains having different voltages and/or different clock frequencies. For example, a power domain including high-clock frequency and/or high-priority components may operate at 0.8V, while a power domain including low-clock frequency and/or low-priority components may operate at 0.2V. To enable such systems to exchange data in an asynchronous manner, a first in, first out (FIFO) queue is typically implemented. The FIFO queue allows a data producer in a first power domain to store data in the FIFO queue at a first rate, while allowing a data consumer in a second power domain to consume the data at a second rate.

Notably, prior to data crossing between the power domains, data from the FIFO queue must be level-shifted to match the voltage of the destination power domain.

Level shifting may result in corruption of the data during transmission between the power domains. Current power domain-crossing FIFO queues do not have any means to detect whether data has been altered during transmission. Consequently, any data corruption at the level of the power domain-crossing FIFO queue will be detected either much later or not at all, which can result in potential safety hazards. Such data corruption is of particular concern in automotive applications, such as advanced driver assistance systems (ADAS), automated driving (AD), and/or in-vehicle infotainment (IVI), where functional safety is of the utmost importance.

Aspects of the present disclosure provide methods and apparatus for transferring data across power domains included in a computing system, such as a SoC. For example, a first error check calculation (e.g., a parity check, a checksum, or a cyclic redundancy check (CRC)) may be performed in a source power domain on data read from a FIFO queue included in the source power domain, prior to the data being transmitted to a destination power domain. A second error check calculation is then performed based on the data received in the destination power domain and compared to first error check calculation to determine whether the data has been corrupted.

It will be appreciated that the methods and apparatus for transferring data across power domains described herein are merely examples of one type of memory system in which the disclosed techniques may be implemented. Aspects of the present disclosure also may be implemented in other system and/or processor architectures, with other types of memory queues having different widths and/or depths, with other types of error check calculations and comparisons, and/or implementing other types of multiplexer and/or switching architectures.

The methods and apparatus for transferring data across power domains included in a computing system described herein provide various advantages. The methods and apparatus described herein may enable earlier detection of data integrity failures in power domain-crossing FIFO queues, increasing the functional safety coverage and metrics of such systems. For example, data integrity failures may be detected on the order of nanoseconds, within several clock cycles of data corruption occurring. By contrast, conventional techniques may take milliseconds (or longer) to determine that data corruption has occurred.

Example Vehicle Control System

FIG. 1 is a block diagram of an example vehicle 100 including a vehicle control system 102 and various sensors suitable for controlling certain systems, such as an ADAS, an AD, and/or an IVI. The vehicle 100 may refer to a means of carrying or transporting something (e.g., a person or cargo). In some aspects, the vehicle 100 may represent a motor vehicle, such as a car, van, truck, semitruck, motorcycle, motorbike, moped, electric bicycle, etc. The vehicle 100 may be a series production road vehicle having safety-related systems that include one or more electrical and/or electronic systems, as further described herein. The vehicle 100 may use an internal combustion engine, an electric motor, or a hybrid propulsion system (e.g., a combination of an engine and an electric motor) for propulsion. In some cases, the vehicle 100 may have one or more electrical and/or electronic systems that comply with certain functional safety standards, such as ISO 26262 as provided by the International Organization for Standardization (ISO).

Figure 2:
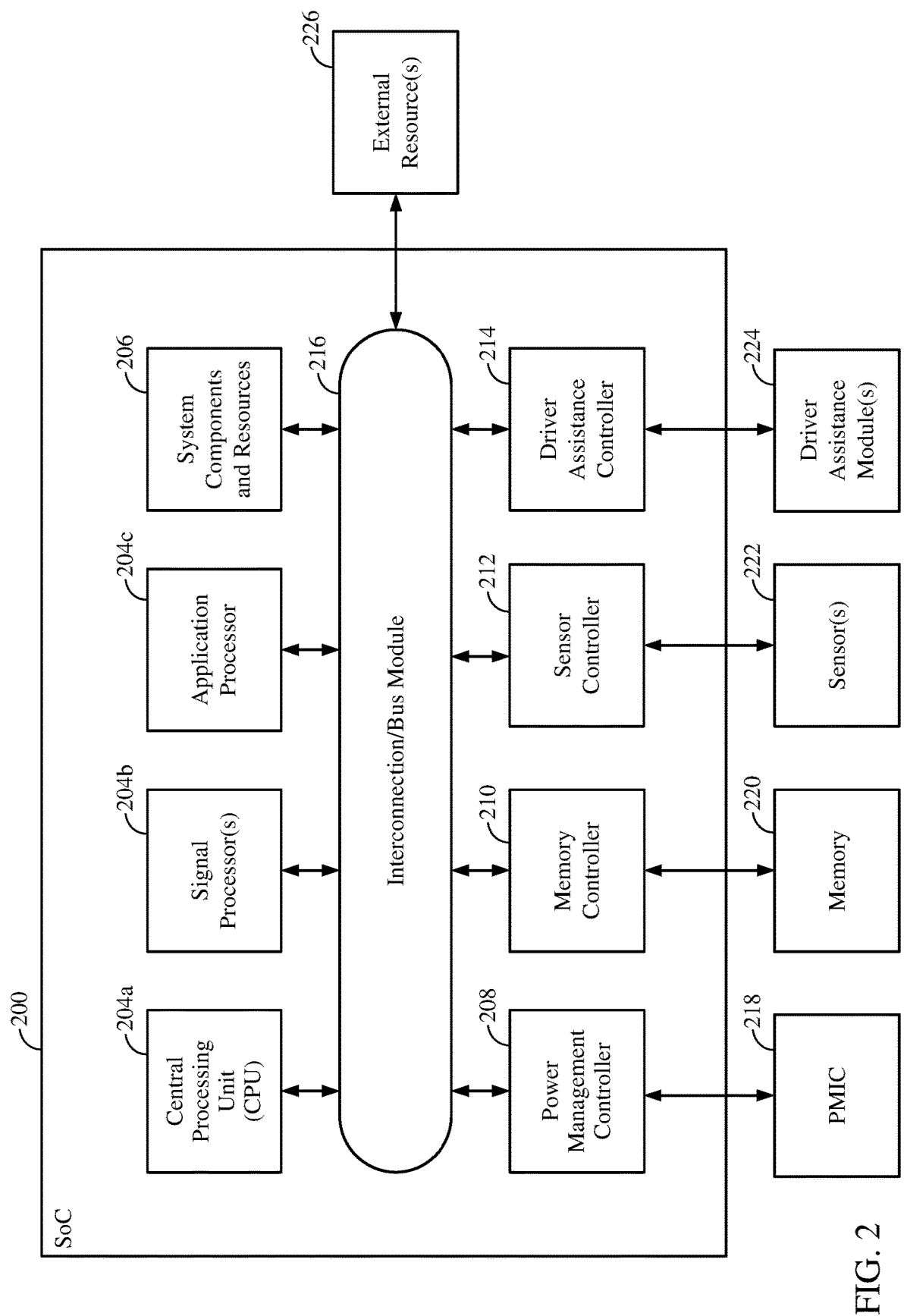
FIG. 2 is a block diagram of example components and interconnections in a system-on-a-chip (SoC).
Figure 3:
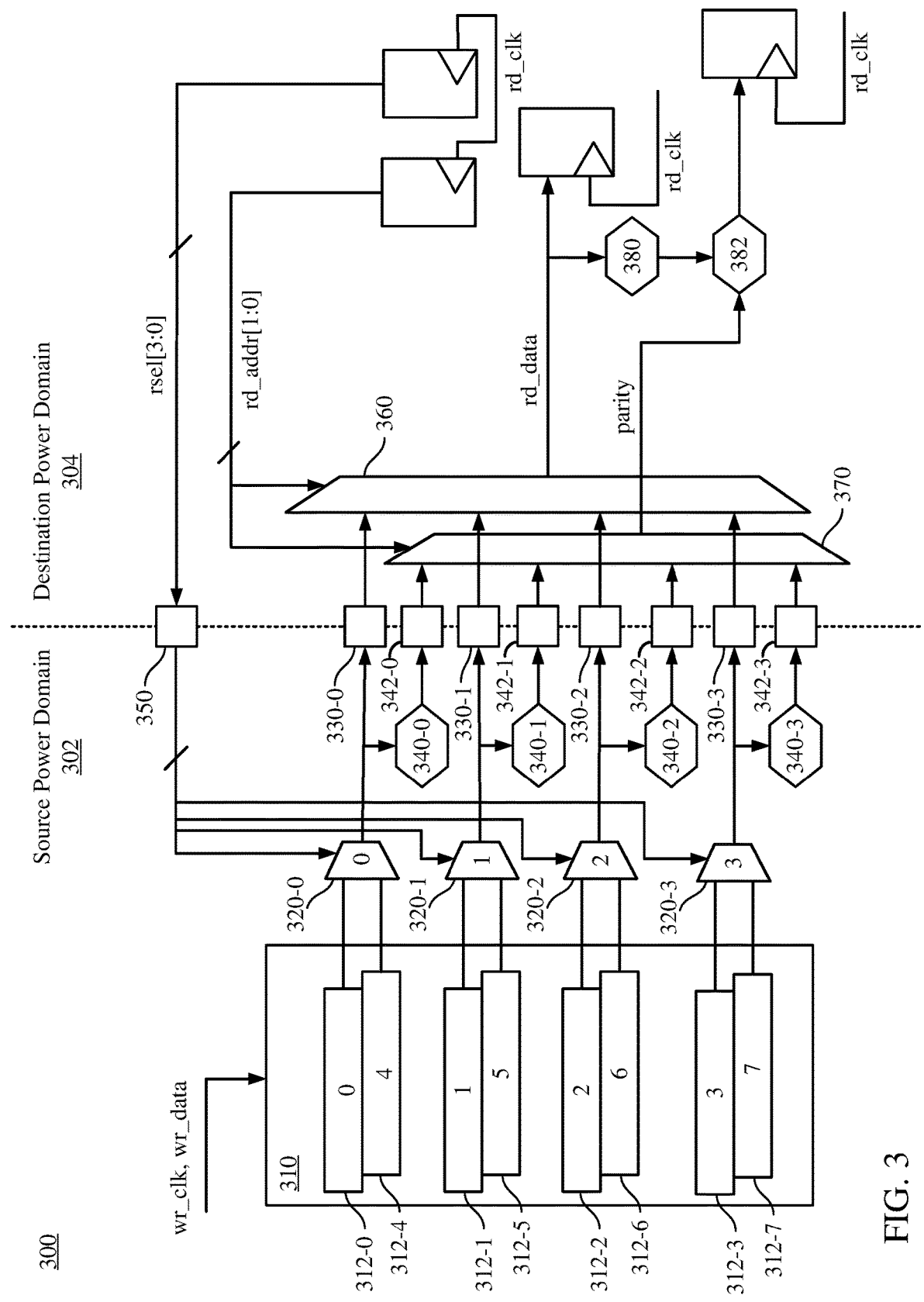
FIG. 3 is a block diagram of a processor having a first in, first out (FIFO) queue for transmitting data from a source power domain to a destination power domain.

The vehicle control system 102 may include one or more computing devices having SoCs (e.g., one or more ECUs) as further described herein with respect to FIGS. 2 and 3. The vehicle control system 102 may be coupled to a variety of vehicle systems and subsystems, such as an environmental system 104 (e.g., an air conditioning and/or heating system), a navigation system 106, a communications and/or infotainment system 108, a power control system 110, a drivetrain control system 112, a driver assistance and/or automated driving control system 114, and/or a variety of sensors 116. Each vehicle systems and sensors 102-116 may communicate with one or more other systems via one or more communication links, which may include wired communication links (e.g., a Controller Area Network (CAN) protocol compliant bus, Universal Serial Bus (USB) connection, Ethernet connection, universal asynchronous receiver-transmitter (UART), etc.) and/or wireless communication links (e.g., a Wi-Fi® link, Bluetooth® link, ZigBee® link, ANT+® link, etc.).

The vehicle control system 102 may perform certain operations associated with any of the vehicle systems and subsystems. For example, the vehicle control system 102 may control or initiate the power-on and/or shutdown sequence for any of the vehicle systems and subsystems. The vehicle control system 102 may monitor for errors associated with any of the vehicle systems and subsystems, and in some cases, the vehicle control system 102 may store the errors for vehicle diagnostics. In response to any errors detected, the vehicle control system 102 may perform certain actions, such as shutting down the affected system or transferring some of the affected operations to be performed at a different vehicle system. The vehicle control system 102 may monitor the power levels supplied to any of the vehicle systems and subsystems and ensure that the power levels supplied satisfy the operating specifications for any of the vehicle systems and subsystems.

The environmental system 104 may control the cooling and/or heating systems associated the vehicle 100. For example, the vehicle 100 may have an air conditioning system, a heating system, heated or cooled seat(s), and/or a heated steering wheel; and the environmental system 104 may adjust the temperature according to user (or default) settings for the respective cooling and/or heating components. The navigation system 106 may show the vehicle's location on a map and provide navigation information, such as directions to a destination, via a display (not shown).

The communications and/or infotainment system 108 may allow the user to access various information (e.g., navigation information, interior or exterior environmental information, ADAS information, etc.), applications, and/or entertainment or media content, such as music and/or videos. The communications and/or infotainment system 108 may allow the user to update or access settings associated with a variety of systems, such as the environmental system 104, the navigation system 106, ADAS, vehicle settings, etc. The communications and/or infotainment system 108 may allow the user and/or vehicle 100 to wirelessly communicate via an integrated modem of the vehicle or via the user's wireless communication device (e.g., a smartphone or tablet).

The power control system 110 may control the components that output power to move the vehicle, such as an internal combustion engine (e.g., adjusting the air-fuel ratio, boost pressure, valve timing, etc.), an electric power system (e.g., controlling regenerative braking, battery power output, battery charging, and/or battery cooling, etc.), and/or a hybrid power system (e.g., controlling regenerative braking, switching between battery power and engine power, battery charging, battery cooling, etc.). The drivetrain control system 112 may control the various components of the vehicle 100 that deliver power to the drive wheels. For example, the drivetrain control system 112 may control gear shifting in an automatic transmission. For a four-wheel drive vehicle, the drivetrain control system 112 may control the power ratio applied to the front and rear drive wheels.

The driver assistance and/or automated driving control system 114 may control various driver assistance features and functions, such as adaptive cruise control, automated lane detection, lane departure warning, automated steering, automated braking, and automated collision avoidance. The driver assistance and/or automated driving control system 114 may control automated driving at various levels of automation, such as any of the Society of Automotive Engineers (SAE) levels 1 through 5.

The variety of sensors 116 coupled to the vehicle control system 102 may include any of the vehicle's speedometer, a wheel speed sensor, a torquemeter, a turbine speed sensor, a variable reluctance sensor, a sonar system, a radar system, an air-fuel ratio meter, a water-in-fuel sensor, an oxygen sensor, a crankshaft position sensor, a curb feeler, a temperature sensor, a Hall effect sensor, a manifold absolute pressure sensor, various fluid sensors (e.g., engine coolant sensor, transmission fluid sensor, etc.), a tire-pressure monitoring sensor, a mass airflow sensor, a speed sensor, a blind spot monitoring sensor, a parking sensor, cameras, microphones, accelerometers, compasses, a global navigation satellite system (GNSS) receiver (e.g., a global positioning system (GPS) receiver or a Galileo receiver), and other similar sensors for monitoring physical or environmental conditions in and around the vehicle.

The aforementioned systems are presented merely as examples, and vehicles may include one or more additional systems that are not illustrated for clarity. Additional systems may include systems related to additional other functions of the vehicular system, including instrumentation, airbags, cruise control, other engine systems, stability control parking systems, tire pressure monitoring, antilock braking, active suspension, battery level and/or management, and a variety of other systems.

Example System-On-A-Chip

The term "system-on-a-chip" (SOC) is used herein to refer to a single integrated circuit (IC) chip that contains multiple resources and/or processors integrated on a single substrate or in a single package. A single SoC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, flash, etc.), and resources (e.g., timers, voltage regulators, oscillators, etc.). The processors, memory blocks, and resources may be operating within different power domains of the SoC. A SoC may also include software for controlling the integrated resources and processors, as well as for controlling peripheral devices.

FIG. 2 is a block diagram of example components and interconnections in a system-on-a-chip (SoC) 200 suitable for implementing various aspects of the present disclosure. In certain aspects, the SoC 200 may be included in a computing device (e.g., an ECU) in a vehicle control system. The SoC 200 may control any of the systems described herein with respect to FIG. 1. For example, the SoC 200 may be configured to control an ADAS/AD system, such as the driver assistance and/or automated driving control system 114 described herein with respect to FIG. 1.

The SoC 200 may include a number of heterogeneous processors 204a-c (collectively processors 204), such as a central processing unit (CPU) 204a, signal processor(s) or other specialized processor(s) 204b (e.g., a digital signal processor, an image signal processor, a neural network signal processor, computer vision processor, a graphics processing unit (GPU), etc.), and/or an application processor 204c. Each processor 204 may include one or more cores, and each processor/core may perform operations independent of the other processors/cores. Each processor 204 may be part of a subsystem (not shown) including one or more processors, caches, etc. configured to handle certain types of tasks or computations. It should be noted that the SoC 200 may include additional processors (not shown) or may include fewer processors (not shown). The SoC 200 may include other processors (e.g., a graphics processing unit, a vision processing unit, etc.) in addition to or instead of those illustrated.

The SoC 200 may include system components and resources 206 for performing certain specialized operations, such as analog-to-digital conversions and/or wireless data transmissions. The system components and resources 206 may include components such as voltage regulators, oscillators, phase-locked loops, peripheral bridges, data controllers, system controllers, access ports, timers, and other similar components used to support the processors and software clients running on the SoC 200. The system components and resources 206 may include circuitry for interfacing with peripheral devices, such as cameras, electronic displays, wireless communication devices, external memory chips, etc.

The SoC 200 may further include a power management controller 208, a memory controller 210 (e.g., a dynamic random access memory (DRAM) memory controller and/or a non-volatile memory controller), a sensor controller 212, and/or a driver assistance controller 214. The SoC 200 may also include an input/output (IO) module (not shown) for communicating with resources external to the SoC, such as a clock and a voltage regulator, each of which may be shared by two or more of the internal SoC components. The IO module may include a general purpose IO (GPIO) interface, for example.

The processors 204 may be interconnected to the system components and resources 206, the power management controller 208, the memory controller 210, the sensor controller 212, the driver assistance controller 214, and/or other system components via an interconnection/bus module 216, which may include an array of reconfigurable logic gates and/or implement a bus architecture (e.g., CoreConnect, advanced microcontroller bus architecture (AMBA), etc.). Communications may be provided by advanced interconnects, such as high performance networks-on-chip (NoCs).

The interconnection/bus module 216 may include or provide a bus mastering system configured to grant SoC components (e.g., processors, peripherals, etc.) exclusive control of the bus (e.g., to transfer data) for a set duration, number of operations, number of bytes, etc. In certain aspects, the bus module 216 may include a direct memory access (DMA) controller (not shown) that enables components connected to the bus module 216 to operate as a master component and initiate memory transactions. The bus module 216 may implement an arbitration scheme to prevent multiple master components from attempting to drive the bus simultaneously.

The power management controller 208 may manage the power supplied to the SoC 200 from a PMIC 218, which may be representative of one or more PMIC(s). The SoC 200 may further be divided into multiple power domains, with the same or separate power management controller(s) and/or PMIC(s) managing power supplied to each power domain. The power management may be separate and independent between different power domains included in the SoC 200.

The memory controller 210 may be a specialized hardware module configured to manage the flow of data to and from a memory 220. The memory controller 210 may include logic for interfacing with the memory 220, such as selecting a row and column in a cell array of the memory 220 corresponding to a memory location, reading or writing data to the memory location, etc. The memory 220 may be an on-chip component (e.g., on the substrate, die, integrated chip, etc.) of the SoC 200, or alternatively (as shown) an off-chip component.

The sensor controller 212 may manage the sensor data received from various sensors 222, such as the sensors 116. The sensor controller 212 may include circuitry for interfacing with the sensors 222. For example, the sensor controller 212 may receive sensor data from a tire pressure monitoring system and/or a radar sensor used for adaptive cruise control.

The driver assistance controller 214 may control certain driver assistance functions via a driver assistance module 224 (e.g., one or more actuators, relays, switches, etc.). For example, the driver assistance controller 214 may control the adaptive cruise control by controlling actuators coupled to the engine and/or braking system. In some cases, the driver assistance controller 214 may perform automated steering by controlling actuators attached to the steering system. It will be appreciated that the driver assistance controller 214 is merely an example, and the SoC 200 may include a controller that interfaces with automated driving components in addition to or instead of the driver assistance controller 214.

The SoC 200 may also include additional hardware and/or software components that are suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, temperature, etc.), cameras, compasses, GPS receivers, communications circuitry (e.g., Bluetooth®, wireless local area network (WLAN), Long Term Evolution (LTE), Fifth Generation New Radio (5G NR), etc.), and other well-known components (e.g., accelerometer, etc.) of modern electronic devices.

In addition to the SoC 200 discussed above, various aspects may be implemented in a wide variety of computing devices, which may include a single processor, multiple processors, multicore processors, or any combination thereof.

Example Error-Checking FIFO Queue

FIG. 3 is a block diagram of a processor 300 having a FIFO queue 310 for transmitting data from a source power domain 302 to a destination power domain 304. In this example, the processor 300 may operate in a vehicle control system and/or any vehicle system or subsystem, as described herein with respect to FIG. 1, or may be implemented in any other type of processor or computing system. The processor 100 may perform various vehicle control operations, such as infotainment, environmental, ADAS, system wide controls, engine controls, drivetrain controls, etc. The processor 300 may include the SoC 200 and corresponding external resources (not shown) as described herein with respect to FIG. 2. In some aspects, the processor 300 may be a component of the SoC 200 (e.g., CPU 204a, driver assistance controller 214, etc.) described herein with respect to FIG. 2.

The FIFO queue 310 includes memory location 312-0, memory location 312-1, memory location 312-2, etc. (collectively "memory locations 312"). The source power domain 302 of the processor 300 further includes source multiplexer 320-0, source multiplexer 320-1, source multiplexer 320-2, etc. (collectively "source multiplexers 320"). Each source multiplexer 320 is coupled to and receives data from two or more memory locations 312 of the FIFO queue 310. Each source multiplexer 320 is further coupled to a data level shifter 330, a source parity calculation circuit 340, and a read select (rsel) level shifter 350. Each source parity calculation circuit 340 (also referred to herein as a "source error circuit") is coupled to a parity level shifter 342. Although FIG. 3 provides an example of a FIFO queue 310 having eight memory locations 312, aspects of the present disclosure may be implemented with a FIFO queue having any depth.

The destination power domain 304 of the processor 300 includes a data multiplexer 360 and a parity multiplexer 370 (collectively referred to herein as "destination multiplexers"). The data multiplexer 360 is coupled to a destination parity calculation circuit 380 (also referred to herein as a "destination error circuit"). The parity multiplexer 370 is coupled to a comparison circuit 382.

In operation, in the source power domain 302, each of the source multiplexers 320 is switched between two or more memory locations 312 based on read select (rsel) data received from the destination power domain 304 via read select level shifter 350. In the example shown in FIG. 3, the rsel data includes 4 bits, where each bit is implemented to control the operation of a different source multiplexer 320. For example, a first bit received via the read select level shifter 350 causes source multiplexer 320-0 to select memory location 312-0 when the first bit is '0' and causes source multiplexer 320-0 to select memory location 312-4 when the first bit is '1'. Similarly, a second bit received via the read select level shifter 350 causes source multiplexer 320-1 to select memory location 312-1 when the first bit is '0' and causes source multiplexer 320-1 to select memory location 312-5 when the first bit is '1', and so forth.

Once source multiplexer 320-0 selects memory location 312-0, data stored in memory location 312-0 is outputted to data level shifter 330-0 and source parity calculation circuit 340-0. The source parity calculation circuit 340-0 calculates a first parity bit based on the data received from source multiplexer 320-0 and outputs the first parity bit to parity level shifter 342-0.

In the destination power domain 304, the data multiplexer 360 is switched between the data level shifters 330, and the parity multiplexer 370 is switched between the parity level shifters 342 based on a read address (rd_addr). In the example shown in FIG. 3, once the data multiplexer 360 selects data level shifter 330-0, data is received from source multiplexer 320-0 via level shifter 330-0. The data is then outputted by data multiplexer 360 as rd_data and is also passed to destination parity calculation circuit 380, where a second parity bit is calculated. Once the parity multiplexer 370 selects parity level shifter 342-0, the first parity bit is received from source parity calculation circuit 340-0 via parity level shifter 342-0 and is passed to the comparison circuit 382. The comparison circuit 382 compares the first parity bit to the second parity bit to generate a result indicating whether the corresponding data was corrupted while being passed from the source power domain 302 to the destination power domain 304. In some aspects, the comparison circuit 382 performs an "exclusive or" (XOR) operation on the parity bits, which generates a result of '0' if the bits are the same or a result of '1' if the bits are different, indicating that the data was corrupted while being passed from the source power domain 302 to the destination power domain 304.

In some aspects, the read addresses received by the data multiplexer 360 and the parity multiplexer 370 may cause the parity level shifter 342-0 to be selected by the parity multiplexer 370 one or more clock cycles after a clock cycle in which the data multiplexer 360 selects corresponding data level shifter 330-0. Such offset timing gives the destination parity calculation circuit 380 sufficient time to generate a parity bit and output the parity bit to the comparison circuit 382, enabling the destination parity calculation circuit 380 and the parity multiplexer 370 to output respective parity bits to the comparison circuit 382 during the same clock cycle.

The above process is repeated in conjunction with source multiplexer 320-1, which selects memory location 312-1 based on a second bit included in read select (rsel) data received via the read select level shifter 350. Data stored in memory location 312-1 is then outputted to data level shifter 330-1, and a party bit is calculated and outputted to parity level shifter 342-1 by source parity calculation circuit 340-1. This process is repeated sequentially for memory location 312-2 based on a third bit included in the read select (rsel) data received via read select level shifter 350, and for memory location 312-3 based on a fourth bit included in the read select (rsel) data received via read select level shifter 350. The first bit included in the read select (rsel) data then flips from a '0' to a '1' based on the read clock (rd_clk), causing source multiplexer 320-0 to switch from memory location 312-0 to memory location 312-4. Similarly, the second, third, and fourth bits included in the read select (rsel) data are sequentially flipped during subsequent read clock cycles to cause source multiplexers 320-1, 320-2, and 320-3 to select memory locations 312-5, 312-6, and 312-7, respectively. In this manner, the source multiplexers 320 are operated to select memory locations 312 in a sequential manner in accordance with the intended operation (i.e., first in, first out) of the FIFO queue 310.

In some aspects, the FIFO queue 310 is coupled to m total source multiplexers 320, and each source multiplexer 320 is coupled to a memory location n as well as a memory location (n+m). For example, as shown in FIG. 3, source multiplexer 320-0 is coupled to memory locations 312-0 (n=0) and 312-4 (n+m=4), source multiplexer 320-1 is coupled to memory locations 312-1 (n=1) and 312-5 (n+m=5). In some aspects, the total number m of source multiplexers 320 coupled to the FIFO queue 310 may be determined according to the equation m=l/2, where l is the total number of memory locations 312 included in the FIFO queue 310. For example, as shown in FIG. 3, when l=8 total memory locations 312 (e.g., 312-0 through 312-7) are included in the FIFO queue 310, m=4 source multiplexers (e.g., 320-0 through 320-3) are implemented.

An example of read select (rsel) data values that may be sequentially received via read select level shifter 350 to implement the switching technique described above are shown in FIG. 4. As shown, each memory location 312-0 through 312-7 may be encoded in the four read select (rsel) bits, such that each bit is implemented to select one memory location 312 coupled to a different 2-to-1 source multiplexer 320 during each read clock cycle (rd_clk) of the destination power domain 304.

As shown, each bit included in the read select (rsel) data is stable for multiple clock cycles (e.g., four clock cycles in the example shown in FIG. 4), causing each memory location 312 to remain selected by a corresponding source multiplexer 320 for multiple (e.g., four) clock cycles. As noted above, in some aspects, each memory location 312 may remain selected by a corresponding source multiplexer 320 for a number of clock cycles that is equal to the total number m of source multiplexers 320 coupled to the FIFO queue 310. One benefit of this technique is that the timing path becomes a multi-cycle path of four (MCP4), which means that error-checking does not need to be completed in a single clock cycle, but can instead be relaxed to four clock cycles while still meeting the requisite timing. This timing relaxation does not impact read operations in the destination power domain 304, since reads (e.g., by data multiplexer 360) are still a single cycle path. Accordingly, data can continue to be read for every clock cycle in the read clock (rd_clk) domain.

In the example shown in FIG. 3 and FIG. 4, each memory location 312-n remains selected by a corresponding source multiplexer 320 for four sequential clock cycles, which provides sufficient time for the source parity calculation circuit 340 to calculate a parity bit and output the parity bit to a parity level shifter 342. For example, as shown in FIG. 4, memory location 312-0 (corresponding to read pointer or "rptr" 0) may be selected while read select (rsel) values 1110, 1100, 1000, and 0000 are outputted via the read select level shifter 350, memory location 312-4 (rptr 4) may be selected while rsel values 0001, 0011, 0111, and 1111 are outputted via the read select level shifter 350, and memory location 312-1 (rptr 1) may be selected while rsel values 1100, 1000, 0000, and 0001 are outputted via the read select level shifter 350. In some aspects, the rd_addr signal causes data multiplexer 360 to select a particular level shifter 330 during the last clock cycle before a corresponding source multiplexer 320 is switched to a different memory location 312 in the FIFO queue 310. For example, the rd_addr signal may cause data multiplexer 360 to: (i) select data level shifter 330-0 when the read select (rsel) values are 0000, (ii) select data level shifter 330-0 again when the read select (rsel) values are 1111, and (iii) select data level shifter 330-1 when the read select (rsel) values are 0001.

A similar technique may be implemented, with a one (or more) clock cycle lag, by the parity multiplexer 370, such that data from a particular memory location 312 is transmitted to the destination parity calculation circuit 380 at least one clock cycle prior to transmitting a parity bit received from the corresponding parity level shifter 342 to the comparison circuit 382. By switching between the data level shifters 330 and parity level shifters 342 in this manner, data from the FIFO queue 310 may be read by the destination power domain 304 in a sequential manner while also monitoring data integrity, without adding latency to FIFO queue 310 access. Accordingly, in some aspects, data may be deterministically accessed from the FIFO queue 310 located in the source power domain 302 based on the read clock signal (rd_clk) of the destination power domain 304.

Figure 5:
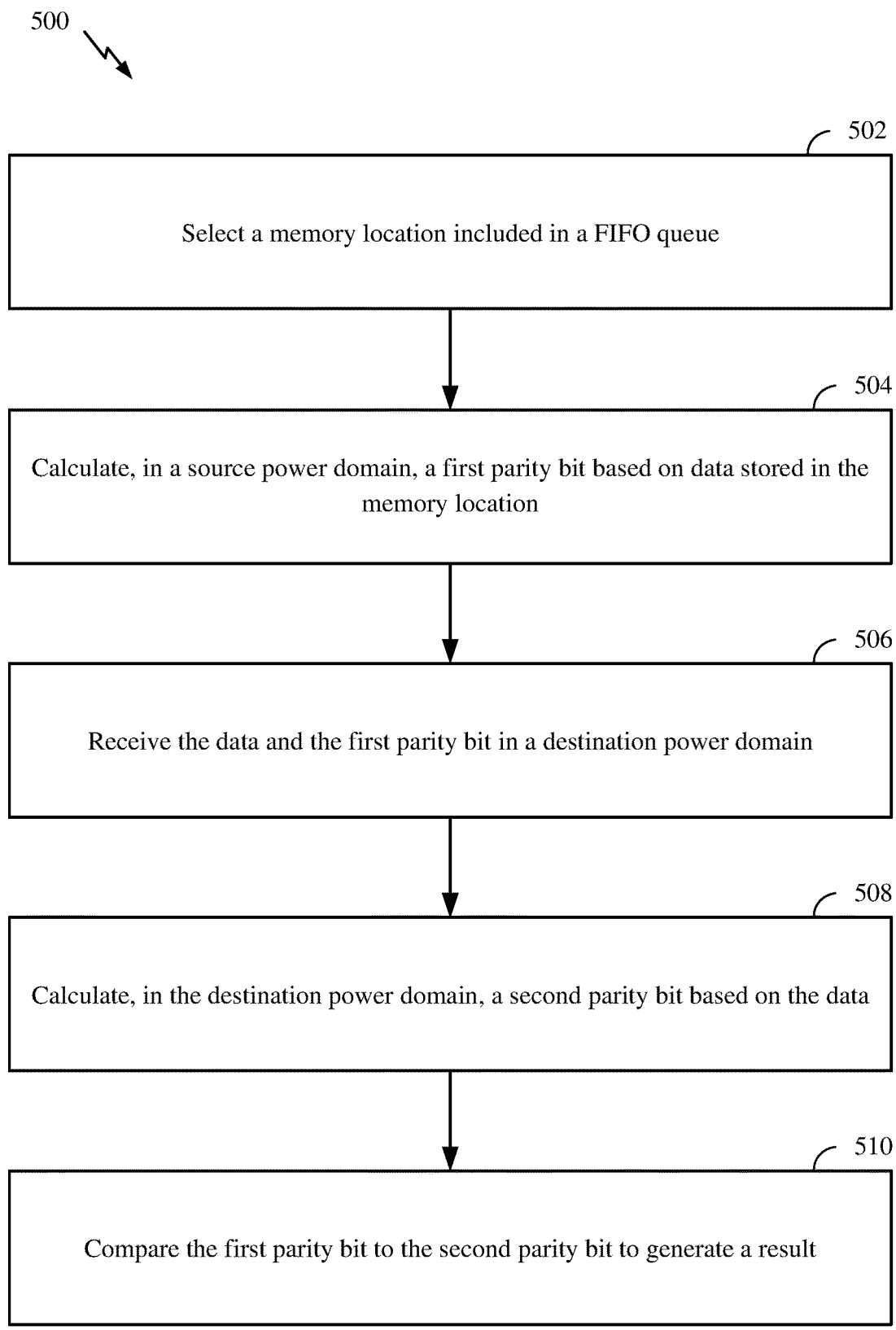
FIG. 5 is a flow diagram depicting example operations for transferring data between power domains.

FIG. 5 is a flow diagram depicting example operations 500 for transferring data between power domains (e.g., with FIFO queue 310). The operations 500 may be performed by a processor (e.g., SoC 200).

The operations 500 may optionally begin, at block 502, where a multiplexer (e.g., source multiplexer 320) included in a source power domain selects a memory location included in a FIFO queue. The multiplexer may select the memory location based on one or more signals received from a destination power domain (e.g., based on data received via a read select level shifter 350). Data stored in the memory location may be outputted to a data level shifter.

At block 504, a parity calculation circuit (e.g., source parity calculation circuit 340) in the source power domain calculates a parity bit based on data stored in the memory location of the FIFO queue. The parity calculation circuit may output the first value to a level shifter (e.g., parity level shifter 342).

At block 506, one or more multiplexers (e.g., data multiplexer 360 and parity multiplexer 370) included in the destination power domain receive the data and the first parity bit. For example, the one or more multiplexers may receive the data and the first parity bit from the source power domain via one or more level shifters.

At block 508, a parity calculation circuit (e.g., destination parity calculation circuit 380) included in the destination power domain calculates a second parity bit based on the data received by the one or more multiplexers. At block 510, a comparison circuit (e.g., comparison circuit 382) compares the first parity bit to the second parity bit to generate a result. For example, the comparison circuit may perform an XOR operation on the first and second parity bits. The result indicates whether the data was corrupted while passing from the source power domain to the destination power domain.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for storing, means for reading, means for switching, means for receiving, means for comparing, means for transmitting, means for calculating, means for selecting, may include a processor (e.g., the SoC 200) and memory (e.g., the memory 220).

Example Aspects

Implementation examples are described in the following numbered aspects:

Aspect 1: A method of transferring data, comprising: selecting, via a source multiplexer, a first memory location included in a first in, first out (FIFO) queue and storing first data, wherein the source multiplexer and the FIFO queue are in a first power domain; outputting the first data to a first level shifter; calculating, in the first power domain, a first value based on the first data; outputting the first value to a second level shifter; selecting, via at least one destination multiplexer included in a second power domain, the first level shifter and the second level shifter; calculating, in the second power domain, a second value based on the first data; and comparing the first value to the second value to generate a result, wherein the result indicates that the first data was corrupted during transmission from the first power domain to the second power domain.

Aspect 2: The method of Aspect 1, wherein calculating the first value comprises calculating a first parity bit, and calculating the second value comprises calculating a second parity bit.

Aspect 3: The method according to any of Aspects 1-2, wherein the first level shifter is selected during a first clock cycle, the second level shifter is also selected during the first clock cycle.

Aspect 4: The method according to any of Aspects 1-3, wherein the source multiplexer is included in a plurality of m total source multiplexers coupled to the FIFO queue, the first memory location is memory location n, and the source multiplexer is coupled to the memory location n and memory location (n+m).

Aspect 5: The method according to any of Aspects 1-4, wherein the memory location n remains selected by the source multiplexer for a first set of m sequential clock cycles, and the memory location (n+m) remains selected by the source multiplexer for a second set of m sequential clock cycles that immediately follow the first set of m sequential clock cycles.

Aspect 6: The method according to any of Aspects 1-5, further comprising: selecting, via the source multiplexer, memory location (n+m) storing second data; outputting the second data to the first level shifter; calculating, in the first power domain, a third value based on the second data; outputting the third value to the second level shifter; selecting, via the at least one destination multiplexer, the first level shifter and the second level shifter; calculating, in the second power domain, a fourth value based on the second data; and comparing the third value to the fourth value to generate a second result, wherein the result indicates that the second data was not corrupted during transmission from the first power domain to the second power domain.

Aspect 7: The method according to any of Aspects 1-6, further comprising receiving, by the m total source multiplexers, at least one signal from a read select level shifter, wherein the read select level shifter is coupled to a read clock signal included in the second power domain.

Aspect 8: The method according to any of Aspects 1-7, further comprising, in response to the at least one signal from the read select level shifter: switching the source multiplexer from selecting the memory location n to selecting the memory location (n+m), and switching a second source multiplexer from selecting a memory location (n+1) included in the FIFO queue to selecting a memory location (n+m+1) included in the FIFO queue, wherein the second source multiplexer is included in the m total source multiplexers coupled to the FIFO queue.

Aspect 9: The method according to any of Aspects 1-8, wherein a number of clock cycles in a multi cycle path between the read select level shifter and an output of the destination multiplexer is less than or equal to m.

Aspect 10: The method according to any of Aspects 1-9, wherein the at least one destination multiplexer comprises a first destination multiplexer and a second destination multiplexer, and further comprising: switching, via the first destination multiplexer, between a plurality of m data level shifters during m sequential clock cycles, wherein each data level shifter receives, via a source multiplexer included in the plurality of m total source multiplexers, data from a memory location of the FIFO queue, and switching, via the second destination multiplexer, between a plurality of m parity level shifters during m sequential clock cycles, each parity level shifter receiving a parity bit calculated based on data received from a memory location of the FIFO queue.

Aspect 11: The method according to any of Aspects 1-10, wherein the first destination multiplexer and the second destination multiplexer are coupled to a read clock included in the second power domain.

Aspect 12: The method according to any of Aspects 1-11, wherein the FIFO queue includes p sequential memory locations, the first memory location is memory location n, and the source multiplexer is coupled to the memory location n and memory location (n+p/2).

Aspect 13: The method according to any of Aspects 1-12, wherein comparing the first value to the second value comprises performing an exclusive or (XOR) operation.

Aspect 14: An apparatus for transferring data, comprising: a source multiplexer coupled to a first memory location included in a first in, first out (FIFO) queue and storing first data, wherein the source multiplexer and the FIFO queue are in a first power domain; a first level shifter coupled to the source multiplexer and configured to receive the first data from the source multiplexer; a source error circuit coupled to the source multiplexer and included in the first power domain, the source error circuit configured to: calculate a first value based on the first data, and output the first value to a second level shifter coupled to the source error circuit; at least one destination multiplexer included in a second power domain and configured to select the first level shifter and the second level shifter; and a destination error circuit coupled to the at least one destination multiplexer and included in the second power domain, the at least one destination multiplexer configured to calculate a second value based on the first data, wherein the first value is compared to the second value to generate a result indicating that the first data was corrupted during transmission from the first power domain to the second power domain.

Aspect 15: The apparatus of Aspect 14, wherein calculating the first value comprises calculating a first parity bit, and calculating the second value comprises calculating a second parity bit.

Aspect 16: The apparatus according to any of Aspects 14-15, wherein the first level shifter is selected during a first clock cycle, the second level shifter is also selected during the first clock cycle.

Aspect 17: The apparatus according to any of Aspects 14-16, wherein the source multiplexer is included in a plurality of m total source multiplexers coupled to the FIFO queue, the first memory location is memory location n, and the source multiplexer is coupled to the memory location n and memory location (n+m).

Aspect 18: The apparatus according to any of Aspects 14-17, wherein the source multiplexer is configured to continuously select the memory location n for a first set of m sequential clock cycles, and the source multiplexer is configured to continuously select the memory location (n+m) for a second set of m sequential clock cycles that immediately follow the first set of m sequential clock cycles.

Aspect 19: The apparatus according to any of Aspects 14-18, wherein: the source multiplexer is further configured to select memory location (n+m) storing second data and output the second data to the first level shifter; the source error circuit is further configured to calculate a third value based on the second data and output the third value to the second level shifter; the at least one destination multiplexer is further configured to select the first level shifter and the second level shifter; and the destination error circuit is configured to calculate a fourth value based on the second data, wherein the third value is compared to the fourth value to generate a second result indicating that the second data was not corrupted during transmission from the first power domain to the second power domain.

Aspect 20: The apparatus according to any of Aspects 14-19, further comprising a read select level shifter configured to output at least one signal to the m total source multiplexers to modify a memory location being selected by at least one source multiplexer included in the m total source multiplexers.

Aspect 21: The apparatus according to any of Aspects 14-20, further comprising a second source multiplexer included in the m total source multiplexers coupled to the FIFO queue, wherein the second source multiplexer is coupled to memory location (n+1) and memory location (n+m+1) included in the FIFO queue.

Aspect 22: The apparatus according to any of Aspects 14-21, wherein, in response to the at least one signal from the read select level shifter: the source multiplexer is further configured to switch from selecting the memory location n to selecting the memory location (n+m), and the second source multiplexer is configured to switch from selecting the memory location (n+1) to selecting the memory location (n+m+1).

Aspect 23: The apparatus according to any of Aspects 14-22, wherein a number of clock cycles in a multi cycle path between the read select level shifter and an output of the destination multiplexer is less than or equal to m.

Aspect 24: The apparatus according to any of Aspects 14-23, wherein the at least one destination multiplexer comprises a first destination multiplexer and a second destination multiplexer, and wherein: the first destination multiplexer is configured to switch between a plurality of m data level shifters that includes the first level shifter during m sequential clock cycles, wherein each data level shifter receives, via a source multiplexer included in the plurality of m total source multiplexers, data from a memory location of the FIFO queue, and the second destination multiplexer is configured to switch between a plurality of m parity level shifters that includes the second level shifter during m sequential clock cycles, each parity level shifter receiving a parity bit calculated based on data received from a memory location of the FIFO queue.

Aspect 25: The apparatus according to any of Aspects 14-24, wherein the first destination multiplexer and the second destination multiplexer are coupled to a read clock included in the second power domain.

Aspect 26: The apparatus according to any of Aspects 14-25, wherein the FIFO queue includes p sequential memory locations, the first memory location is memory location n, and the source multiplexer is coupled to the memory location n and memory location (n+p/2).

Aspect 27: A vehicle control system, comprising: a system-on-a-chip (SoC) having a first power domain and a second power domain, the SoC comprising: a source multiplexer coupled to a first memory location included in a first in, first out (FIFO) queue and storing first data, wherein the source multiplexer and the FIFO queue are in the first power domain; a first level shifter coupled to the source multiplexer and configured to receive the first data from the source multiplexer; a source error circuit coupled to the source multiplexer and included in the first power domain, the source error circuit configured to: calculate a first value based on the first data, and output the first value to a second level shifter coupled to the source error circuit; at least one destination multiplexer included in the second power domain and configured to select the first level shifter and the second level shifter; and a destination error circuit coupled to the at least one destination multiplexer and included in the second power domain, the at least one destination multiplexer configured to calculate a second value based on the first data, wherein the first value is compared to the second value to generate a result indicating that the first data was corrupted during transmission from the first power domain to the second power domain.

Aspect 28: The vehicle control system of Aspect 27, wherein the source multiplexer is included in a plurality of m total source multiplexers coupled to the FIFO queue, the first memory location is memory location n, and the source multiplexer is coupled to the memory location n and memory location (n+m).

Aspect 29: The vehicle control system according to any of Aspects 27-28, wherein: the source multiplexer is further configured to select memory location (n+m) storing second data and output the second data to the first level shifter; the source error circuit is further configured to calculate a third value based on the second data and output the third value to the second level shifter; the at least one destination multiplexer is further configured to select the first level shifter and the second level shifter; and the destination error circuit is configured to calculate a fourth value based on the second data, wherein the third value is compared to the fourth value to generate a second result indicating that the second data was not corrupted during transmission from the first power domain to the second power domain.

Aspect 30: The vehicle control system according to any of Aspects 27-29, further comprising a second source multiplexer included in the m total source multiplexers coupled to the FIFO queue, wherein the second source multiplexer is coupled to memory location (n+1) and memory location (n+m+1) included in the FIFO queue.

Additional Considerations

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B and object B touches object C, then objects A and C may still be considered coupled to one another—even if objects A and C do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits.

The apparatus and methods described in the detailed description are illustrated in the accompanying drawings by various blocks, modules, components, circuits, steps, processes, algorithms, etc. (collectively referred to as "elements"). These elements may be implemented using hardware, for example.

One or more of the components, steps, features, and/or functions illustrated herein may be rearranged and/or combined into a single component, step, feature, or function or embodied in several components, steps, or functions. Additional elements, components, steps, and/or functions may also be added without departing from features disclosed herein. The apparatus, devices, and/or components illustrated herein may be configured to perform one or more of the methods, features, or steps described herein.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover at least: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of transferring data, comprising:
   selecting, via a source multiplexer, a first memory location included in a first in, first out (FIFO) queue and storing first data, wherein the source multiplexer and the FIFO queue are in a first power domain, wherein the source multiplexer is included in a plurality of m total source multiplexers coupled to the FIFO queue, the first memory location is memory location n, and the source multiplexer is coupled to the memory location n and memory location (n+m);
   outputting the first data to a first level shifter;
   calculating, in the first power domain, a first value based on the first data;
   outputting the first value to a second level shifter;
   selecting, via at least one destination multiplexer included in a second power domain, the first level shifter and the second level shifter;
   calculating, in the second power domain, a second value based on the first data;
   comparing the first value to the second value to generate a result, wherein the result indicates that the first data was corrupted during transmission from the first power domain to the second power domain;
   selecting, via the source multiplexer, memory location (n+m) storing second data;
   outputting the second data to the first level shifter;
   calculating, in the first power domain, a third value based on the second data;
   outputting the third value to the second level shifter;
   selecting, via the at least one destination multiplexer, the first level shifter and the second level shifter;
   calculating, in the second power domain, a fourth value based on the second data; and
   comparing the third value to the fourth value to generate a second result, wherein the second result indicates that the second data was not corrupted during transmission from the first power domain to the second power domain.

2. The method of claim 1, wherein calculating the first value comprises calculating a first parity bit, and calculating the second value comprises calculating a second parity bit.

3. The method of claim 1, wherein the first level shifter is selected during a first clock cycle, the second level shifter is also selected during the first clock cycle.

4. The method of claim 1, wherein the memory location n remains selected by the source multiplexer for a first set of m sequential clock cycles, and the memory location (n+m) remains selected by the source multiplexer for a second set of m sequential clock cycles that immediately follow the first set of m sequential clock cycles.

5. The method of claim 1, further comprising receiving, by the m total source multiplexers, at least one signal from a read select level shifter, wherein the read select level shifter is coupled to a read clock signal included in the second power domain.

6. The method of claim 5, further comprising, in response to the at least one signal from the read select level shifter:
   switching the source multiplexer from selecting the memory location n to selecting the memory location (n+m), and
   switching a second source multiplexer from selecting a memory location (n+1) included in the FIFO queue to selecting a memory location (n+m+1) included in the FIFO queue, wherein the second source multiplexer is included in the m total source multiplexers coupled to the FIFO queue.

7. The method of claim 5, wherein a number of clock cycles in a multi cycle path between the read select level shifter and an output of the destination multiplexer is equal to m.

8. The method of claim 1, wherein the FIFO queue includes p sequential memory locations, the first memory location is memory location n, and the source multiplexer is coupled to the memory location n and memory location (n+p/2).

9. The method of claim 1, wherein comparing the first value to the second value comprises performing an exclusive or (XOR) operation.

10. A method of transferring data, comprising:
    selecting, via a source multiplexer, a first memory location included in a first in, first out (FIFO) queue and storing first data, wherein the source multiplexer and the FIFO queue are in a first power domain, wherein the source multiplexer is included in a plurality of m total source multiplexers coupled to the FIFO queue, the first memory location is memory location n, and the source multiplexer is coupled to the memory location n and memory location (n+m);
    outputting the first data to a first level shifter;
    calculating, in the first power domain, a first value based on the first data;
    outputting the first value to a second level shifter;
    selecting, via at least one destination multiplexer included in a second power domain, the first level shifter and the second level shifter;
    calculating, in the second power domain, a second value based on the first data;
    comparing the first value to the second value to generate a result, wherein the result indicates that the first data was corrupted during transmission from the first power domain to the second power domain, wherein the at least one destination multiplexer comprises a first destination multiplexer and a second destination multiplexer;
    switching, via the first destination multiplexer, between a plurality of m data level shifters during m sequential clock cycles, wherein each data level shifter receives, via a source multiplexer included in the plurality of m total source multiplexers, data from a memory location of the FIFO queue; and
    switching, via the second destination multiplexer, between a plurality of m parity level shifters during m sequential clock cycles, each parity level shifter receiving a parity bit calculated based on data received from a memory location of the FIFO queue.

11. The method of claim 10, wherein the first destination multiplexer and the second destination multiplexer are coupled to a read clock included in the second power domain.

12. An apparatus for transferring data, comprising:
- a source multiplexer coupled to a first memory location included in a first in, first out (FIFO) queue and storing first data, wherein the source multiplexer and the FIFO queue are in a first power domain;
- a first level shifter coupled to the source multiplexer and configured to receive the first data from the source multiplexer;
- a source error circuit coupled to the source multiplexer and included in the first power domain, the source error circuit configured to:
  - calculate a first value based on the first data, and
  - output the first value to a second level shifter coupled to the source error circuit;
- at least one destination multiplexer included in a second power domain and configured to select the first level shifter and the second level shifter; and
- a destination error circuit coupled to the at least one destination multiplexer and included in the second power domain, the destination error circuit configured to calculate a second value based on the first data,
- wherein the first value is compared to the second value to generate a result indicating that the first data was corrupted during transmission from the first power domain to the second power domain.

13. The apparatus of claim 12, wherein calculating the first value comprises calculating a first parity bit, and calculating the second value comprises calculating a second parity bit.

14. The apparatus of claim 12, wherein the first level shifter is selected during a first clock cycle, the second level shifter is also selected during the first clock cycle.

15. The apparatus of claim 12, wherein the source multiplexer is included in a plurality of m total source multiplexers coupled to the FIFO queue, the first memory location is memory location n, and the source multiplexer is coupled to the memory location n and memory location (n+m).

16. The apparatus of claim 15, wherein the source multiplexer is configured to continuously select the memory location n for a first set of m sequential clock cycles, and the source multiplexer is configured to continuously select the memory location (n+m) for a second set of m sequential clock cycles that immediately follow the first set of m sequential clock cycles.

17. The apparatus of claim 15, wherein:
- the source multiplexer is further configured to select memory location (n+m) storing second data and output the second data to the first level shifter;
- the source error circuit is further configured to calculate a third value based on the second data and output the third value to the second level shifter;
- the at least one destination multiplexer is further configured to select the first level shifter and the second level shifter; and
- the destination error circuit is configured to calculate a fourth value based on the second data,
- wherein the third value is compared to the fourth value to generate a second result indicating that the second data was not corrupted during transmission from the first power domain to the second power domain.

18. The apparatus of claim 15, further comprising a read select level shifter configured to output at least one signal to the m total source multiplexers to modify a memory location being selected by at least one source multiplexer included in the m total source multiplexers.

19. The apparatus of claim 18, further comprising a second source multiplexer included in the m total source multiplexers coupled to the FIFO queue, wherein the second source multiplexer is coupled to memory location (n+1) and memory location (n+m+1) included in the FIFO queue.

20. The apparatus of claim 19, wherein, in response to the at least one signal from the read select level shifter:
- the source multiplexer is further configured to switch from selecting the memory location n to selecting the memory location (n+m), and
- the second source multiplexer is configured to switch from selecting the memory location (n+1) to selecting the memory location (n+m+1).

21. The apparatus of claim 18, wherein a number of clock cycles in a multi cycle path between the read select level shifter and an output of the destination multiplexer is less than or equal to m.

22. The apparatus of claim 15, wherein the at least one destination multiplexer comprises a first destination multiplexer and a second destination multiplexer, and wherein:
- the first destination multiplexer is configured to switch between a plurality of m data level shifters that includes the first level shifter during m sequential clock cycles, wherein each data level shifter receives, via a source multiplexer included in the plurality of m total source multiplexers, data from a memory location of the FIFO queue, and
- the second destination multiplexer is configured to switch between a plurality of m parity level shifters that includes the second level shifter during m sequential clock cycles, each parity level shifter receiving a parity bit calculated based on data received from a memory location of the FIFO queue.

23. The apparatus of claim 22, wherein the first destination multiplexer and the second destination multiplexer are coupled to a read clock included in the second power domain.

24. The apparatus of claim 12, wherein the FIFO queue includes p sequential memory locations, the first memory location is memory location n, and the source multiplexer is coupled to the memory location n and memory location (n+p/2).

25. A vehicle control system, comprising:
- a system-on-a-chip (SoC) having a first power domain and a second power domain, the SoC comprising:
  - a source multiplexer coupled to a first memory location included in a first in, first out (FIFO) queue and storing first data, wherein the source multiplexer and the FIFO queue are in the first power domain;
  - a first level shifter coupled to the source multiplexer and configured to receive the first data from the source multiplexer;
  - a source error circuit coupled to the source multiplexer and included in the first power domain, the source error circuit configured to:
    - calculate a first value based on the first data, and
    - output the first value to a second level shifter coupled to the source error circuit;
  - at least one destination multiplexer included in the second power domain and configured to select the first level shifter and the second level shifter; and
  - a destination error circuit coupled to the at least one destination multiplexer and included in the second power domain, the destination error circuit configured to calculate a second value based on the first data, wherein the first value is compared to the second value to generate a result indicating that the first data was corrupted during transmission from the first power domain to the second power domain.

26. The vehicle control system of claim 25, wherein the source multiplexer is included in a plurality of m total source multiplexers coupled to the FIFO queue, the first memory location is memory location n, and the source multiplexer is coupled to the memory location n and memory location (n+m).

27. The vehicle control system of claim 26, wherein:

the source multiplexer is further configured to select memory location (n+m) storing second data and output the second data to the first level shifter;

the source error circuit is further configured to calculate a third value based on the second data and output the third value to the second level shifter;

the at least one destination multiplexer is further configured to select the first level shifter and the second level shifter; and the destination error circuit is configured to calculate a fourth value based on the second data, wherein the third value is compared to the fourth value to generate a second result indicating that the second data was not corrupted during transmission from the first power domain to the second power domain.

28. The vehicle control system of claim 26, further comprising a second source multiplexer included in the m total source multiplexers coupled to the FIFO queue, wherein the second source multiplexer is coupled to memory location (n+1) and memory location (n+m+1) included in the FIFO queue.

* * * * *